United States Patent
Debalko

Patent Number: 5,721,773
Date of Patent: Feb. 24, 1998

[54] LIGHTNING PROTECTED MAINTENANCE TERMAINATION UNIT

[75] Inventor: George Andrew Debalko, Washington Township, Morris County, N.J.

[73] Assignee: Lucent-Technologies Inc., Murray-Hill, N.J.

[21] Appl. No.: 413,583

[22] Filed: Mar. 30, 1995

[51] Int. Cl.⁶ .................................................. H04M 1/74
[52] U.S. Cl. ......................... 379/412; 379/412; 361/119
[58] Field of Search ............................ 379/2, 26, 27, 379/29, 399, 412; 361/18, 111, 119

[56] References Cited

U.S. PATENT DOCUMENTS

| | | | |
|---|---|---|---|
| 3,725,613 | 4/1973 | Allen et al. | 379/26 |
| 3,795,840 | 3/1974 | Cambra | 361/118 X |
| 3,975,664 | 8/1976 | Baumbach | 361/119 X |
| 4,335,345 | 6/1982 | Franchet | 361/119 X |
| 4,396,809 | 8/1983 | Brussen | 379/201 |
| 4,529,847 | 7/1985 | DeBalko. | |
| 4,626,955 | 12/1986 | Cwirzen | 361/119 |
| 4,695,916 | 9/1987 | Satoh et al. | 361/119 X |
| 4,710,949 | 12/1987 | Ahuja | 379/26 |
| 4,827,497 | 5/1989 | Norris et al. | 379/26 |
| 4,852,145 | 7/1989 | Bevers et al. | 379/412 X |
| 4,903,295 | 2/1990 | Shannon et al. | 379/412 X |
| 4,964,160 | 10/1990 | Traube et al. | 379/412 |
| 5,146,384 | 9/1992 | Markovic et al. | 379/412 X |
| 5,161,183 | 11/1992 | Maytum | 379/412 |
| 5,334,553 | 8/1994 | Popat et al. | 361/119 X |
| 5,442,519 | 8/1995 | DeBalko et al. | 361/784 |
| 5,524,043 | 6/1996 | DeBalko | 379/2 |

*Primary Examiner*—Harry S. Hong
*Assistant Examiner*—Scott L. Weaver
*Attorney, Agent, or Firm*—Lester H. Birnbaum

[57] ABSTRACT

Disclosed is a maintenance termination unit which is protected against lightening strikes and excessive currents. Resistors are placed in series with the tip and ring switches of the unit. Voltage breakdown devices, such as gas tube protectors, are coupled in a parallel with the resistors and switches.

6 Claims, 1 Drawing Sheet

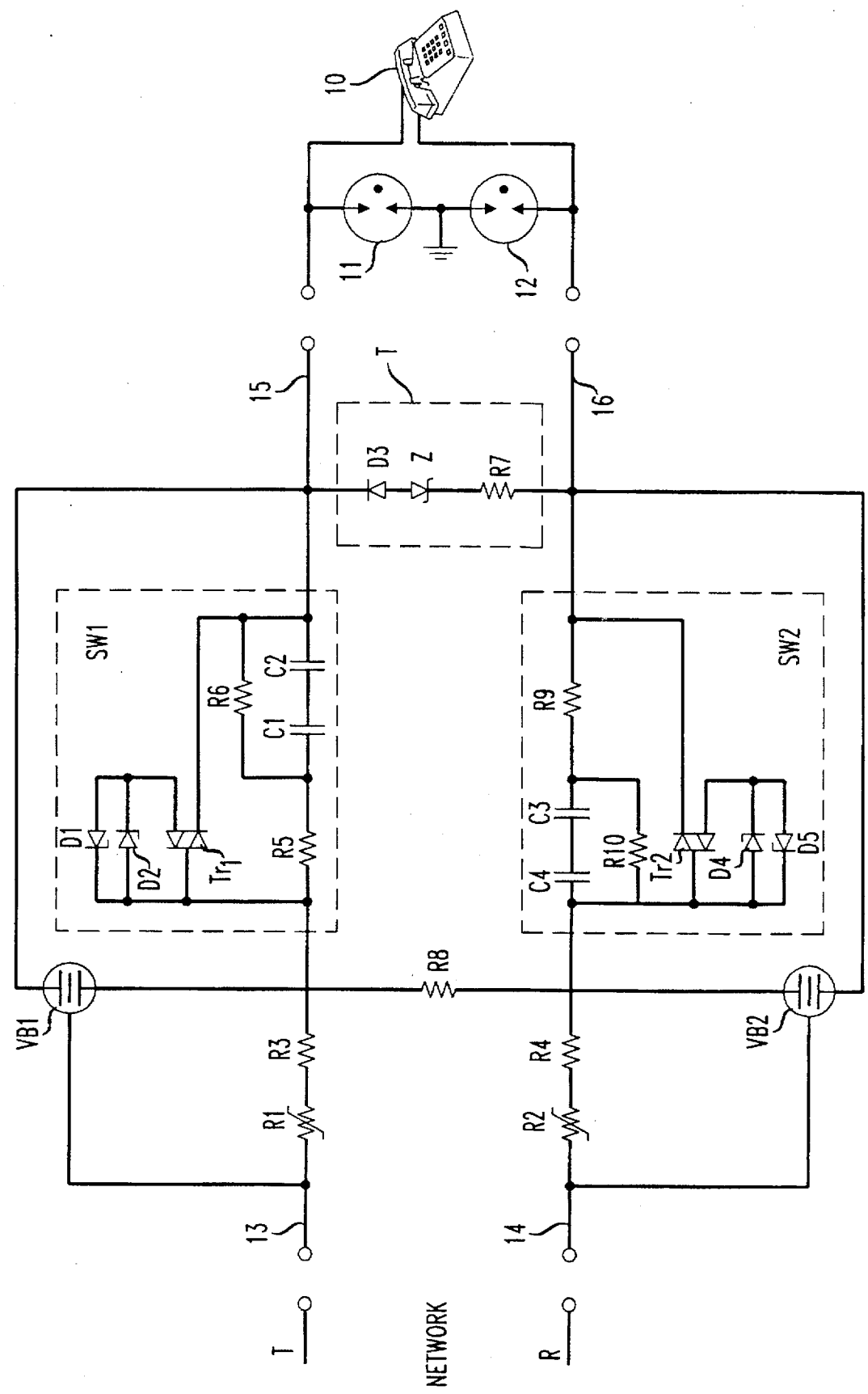

LIGHTNING PROTECTED MAINTENANCE TERMAINATION UNIT

BACKGROUND OF THE INVENTION

This invention relates to maintenance termination units for telecommunications systems.

In modern telecommunications systems, a line of demarcation exists between the telecommunications network owned and maintained by the provider and the customer premises equipment owned and maintained by the customer. A maintenance termination unit (MTU) is a circuit commonly used to determine whether any defects reside in the network or in the customer's equipment. Basically, the unit comprises bidirectional switches which are activated by a predetermined voltage and current level on the lines in order to disconnect the customer's equipment from the network. If the fault persists after the customer has been disconnected, the problem lies in the network. (See, for example, U.S. Pat. No. 4,396,809 issued to Brunssen, and U.S. Pat. No. 4,529, 847 issued to DeBalko.)

In prior art systems, the unit is usually placed on the customer's side of the station protectors which protect against lightning strikes and excessive currents. However, telephone operating companies are increasingly interested in placing the MTUs in the loop on the network side of the protectors (typically, on the pole in the street). Such a placement will increase the number and intensity of lighting hits on the unit, which can damage the unit. Further, the unit becomes more susceptible to induced voltage resulting from power crosses when a power line accidentally makes contact with a phone cable.

SUMMARY OF THE INVENTION

The invention is a circuit for disconnecting a customer from a telecommunications network. The circuit includes first and second switching means adapted for electrically coupling in series with tip and ring conductors of a telecommunications network. First and second resistors are coupled in series with respective switching means. First and second voltage breakdown devices are coupled in parallel with respective resistors and switching means such that current is shunted from the switching means when the voltage across the resistors reaches a predetermined value.

BRIEF DESCRIPTION OF THE DRAWING

These and other features of the invention are delineated in detail in the description to follow. In the drawing:

The FIGURE is a schematic diagram of a circuit in accordance with an embodiment of the invention.

DETAILED DESCRIPTION

The FIGURE illustrates the tip (T) and ring (R) lines from the telecommunications network. The circuit according to the invention is adapted for coupling between these tip and ring lines and the customer premises tip and ring (CT and CR) lines with the standard protectors, such as gas tube protectors, 11 and 12, connected between CT and CR. These protectors, 11 and 12, are used to protect the customer premises equipment, illustrated as 10.

The circuit according to the invention includes a first conductor, 13, adapted for electrical connection to the network tip (T) wire, and a second conductor, 14, adapted for electrical connection to the network ring (R) wire. The first conductor, 13, is connected to a first current-limiting resistor, $R_1$. Similarly, the second conductor, 14, is coupled to a second current-limiting resistor, $R_2$. The resistors, $R_1$ and $R_2$, are characterized by the fact that they exhibit a low resistance (typically 1–6 ohms) until such time as a high current (typically greater than 0.5 amps) is applied thereto. When the high current is applied, the resistance of $R_1$ and $R_2$ will increase (typically to a value of greater than 10K ohms). These resistors, $R_1$ and $R_2$, may be in the form of standard components known in the art as PTC or Poly Switch devices.

The current-limiting resistor $R_1$ is coupled in series to a standard resistor, $R_3$, and, likewise, the current-limiting resistor $R_2$ is coupled to a standard resistor, $R_4$. The resistors $R_3$ and $R_4$, which can be identical, typically have a resistance of 10–20 ohms.

The resistors $R_3$ and $R_4$ are coupled in series with respective bidirectional switches, $SW_1$ and $SW_2$. Such switches may be the standard type used in MTUs. In this example, each switch, e.g., $SW_1$, includes a triac, $T_1$, which is gated by a pair of parallel connected triacs, $D_1$ and $D_2$. A series connection of capacitors, $C_1$ and $C_2$, and resistor $R_5$ is coupled in parallel with the triac. A resistor, $R_6$, is also coupled in parallel with the capacitors $C_1$ and $C_2$. The switches $SW_1$ and $SW_2$ are, in turn, coupled to conductors 15 and 16 and to a distinctive termination, T, which, in this example, includes an oppositely poled conventional diode, $D_3$, and zener diode, Z, in series with a resistor, $R_7$.

A voltage breakdown device, $VB_1$ and $VB_2$, is coupled in parallel with respective resistors, $R_1$, $R_3$ and $R_2$, $R_4$, and switches, $SW_1$ and $SW_2$. In this example, the voltage breakdown devices, $VB_1$ and $VB_2$, are standard gas tube protectors, such as those sold by TII under the designation "Model 73-230-FS". Typical voltage breakdowns range from 230–260 volts. It will be noted that each breakdown device, e.g., $VB_1$, includes three terminals, one coupled to an input conductor, 13, one coupled to an output conductor, 15, and one coupled to the other breakdown device, $VB_2$, through a resistor, $R_8$.

The normal operation of the MTU is much the same as a standard MTU such as shown, for example, in U.S. Pat. No. 4,396,809 issued to Brunssen and U.S. Pat. No. 4,529,847 issued to DeBalko, which are incorporated by reference herein. Thus, the switches $SW_1$ and $SW_2$ are normally open. When a sufficient voltage is supplied to conductors 13 and 14 as, for example, by the customer going off-hook, the switches will close to provide service to the customer through conductors 15 and 16. In particular, when the threshold voltage (e.g., 34 volts for the combined switches $SW_1$ and $SW_2$) is reached, the triacs, $D_1$ and $D_2$, conduct, thereby gating the triac, $T_1$, into a conductive condition. This results in a low impedance path between the conductors 13 and 14 and the customer's equipment so that normal telecommunications can be carried on. During normal telecommunications, the termination, T, presents a high impedance due to the oppositively disposed diodes, $D_3$ and Z, so that these elements are invisible to the customer.

When it is desired to test for the presence of the MTU, a voltage from the central office (e.g., 60–100 volts) is applied to conductors 13 and 14 which is sufficient not only to close the switches, $SW_1$ and $SW_2$, but also to break down the zener diode, Z, to provide current flow through the diodes and the resistor, $R_7$. The central office can thereby recognize the presence of this distinctive termination.

When it is desired to test for a fault, the central office applies a high dc voltage (e.g., 60–100 volts) to the conductors 13 and 14, so that switches $SW_1$ and $SW_2$ are closed. If there is a fault anywhere between the central office and the customer's equipment, it will be detected by the central office. A lower voltage (e.g., less than 12 volts), which is insufficient to close switches $SW_1$ and $SW_2$, is then applied to disconnect the customer's equipment, 10, and station protectors, 11 and 12. If the fault persists, it is now known that the fault is in the network.

In the event of a lightning strike, an even higher voltage (typically greater than 230 volts) will appear at resistors $R_1$, $R_3$ and $R_2$, $R_4$. The voltage across the resistors will cause the conduction of the corresponding breakdown devices, $VB_1$ or $VB_2$, thereby shunting the excess current away from the switches, $SW_1$ or $SW_2$, onto conductors 15 and 16.

In this mode, the resistor, $R_1$, $R_3$ and $R_2$, $R_4$, function to establish the necessary voltage drop to trigger the breakdown devices. For example, if the combined resistances of $R_1$ and $R_3$ (as well as $R_2$ and $R_4$) is 20 ohms, a voltage of approximately 230 volts is established with a lightning current of 12 amps and the breakdown devices, $VB_1$ and $VB_2$, will be triggered into their low impedance state. Current-limiting resistors $R_1$ and $R_2$ do not quickly change their impedances because lightning strikes typically have too small a duration for the resistors to change.

In the event that a low voltage power cross (typically 110 volts) occurs, the resistors, $R_1$ and $R_2$, will change their resistance to limit the currents through the switches, $SW_1$ and $SW_2$. The breakdown devices, $VB_1$ and $VB_2$, will not trigger because the voltage is too low. Once the excess voltage disappears, $R_1$ and $R_2$ return to their normal low resistance.

A high voltage (e.g., greater than 230 volts) can also be induced on the conductors 13 and 14 due to a power cross. In that case, the breakdown devices, $VB_1$ and $VB_2$, will trigger to protect the switches, $SW_1$ and $SW_2$. However, if the surge lasts for too long a period of time, the gas tubes can begin to overheat. To prevent this, standard gas tubes include a fail safe mechanism which will cause the devices to short circuit. If this happens, a permanent short circuit is established across the switches, $SW_1$ and $SW_2$, by short circuiting all three terminals of $VB_1$ and $VB_2$ to protect the switches and continue service, but the network provider needs to know that the breakdown devices have to be replaced. Therefore, the present circuit connects the third lead of the breakdown devices, $VB_1$ and $VB_2$, together through a resistor, $R_8$. The network provider can send a standard test signal (e.g., greater than 40 volts) which will tell the provider that a resistance, $R_8$, now appears across the conductors 13 and 14 and this means that the customer's breakdown devices have short circuited.

Various modifications will become apparent to those skilled in the art. For example, although gas tubes have been described, any breakdown devices, such as solid state protectors, can be employed across the switches. In the context of this application, a "breakdown device" is any device which will go from a high impedance to a low impedance state when the voltage across the devices reaches a predetermined value. Further, although breakdown devices with three leads have been shown, two lead devices can be employed with one lead coupled to an input conductor, 13 or 14, and the other lead coupled to an output conductor (15 or 16). However, the three lead devices are preferred since they permit the identification of a shorted device as discussed above. Further, the invention could be used with any type of switches, $SW_1$ and $SW_2$, including relays, which operate to disconnect a customer from the network on non-traditional-POTS service (including ISDN).

The invention claimed is:

1. A circuit for disconnecting a customer from a telecommunications network comprising:

a first input conductor adapted for coupling to a tip conductor of a telecommunications network;

a first output conductor adapted for coupling to a ring conductor of the telecommunications network;

a second input conductor adapted for coupling to an input conductor of a customer's equipment;

a second output conductor adapted for coupling to an output conductor of the customer's equipment;

a first switch coupled to the first input conductor and the second output conductor;

a second switch coupled to the second input conductor and the first output conductor;

a first resistor connected in series with the first switch;

a second resistor connected in series with the second switch;

a first breakdown device having at least two terminals, wherein a first of the at least two terminals is coupled to the first input conductor and a second of the at least two terminals is coupled to the second output conductor, the first breakdown device is coupled in parallel with the first resistor and the first switch and is responsive to a voltage across the first resistor to shunt current from the first switch; and a second breakdown device having at least two terminals, wherein a first of the at least two terminals is coupled to the second input conductor and a second of the at least two terminals is coupled to the first output conductor, the second breakdown device is coupled in parallel with the second resistor and the second switch and is responsive to a voltage across the second resistor to shunt current from the second switch.

2. The circuit of claim 1 further comprising:

a third resistor coupled in series with the first resistor; and a fourth resistor coupled in series with the second resistor, wherein the first and second resistors have a constant resistance and the third and fourth resistors are responsive to an applied current to vary resistance.

3. The circuit of claim 1, further comprising gas tube protectors, wherein the gas tube protectors are coupled to the second input conductor and the second output conductor.

4. The circuit of claim 1, wherein a third terminal of the at least two terminals of the first breakdown device is connected to a third terminal of the at least two terminals of the second breakdown device.

5. The circuit of claim 4 further comprising:

a third resistor connected in series between the third terminal of the at least two terminals of the first breakdown device and the third terminal of the at least two terminals of the second breakdown device.

6. The circuit of claim 1, wherein the first switch comprises a triac gated by a triac and the second switch comprises a triac gated by a diac.

* * * * *